Figure 1:
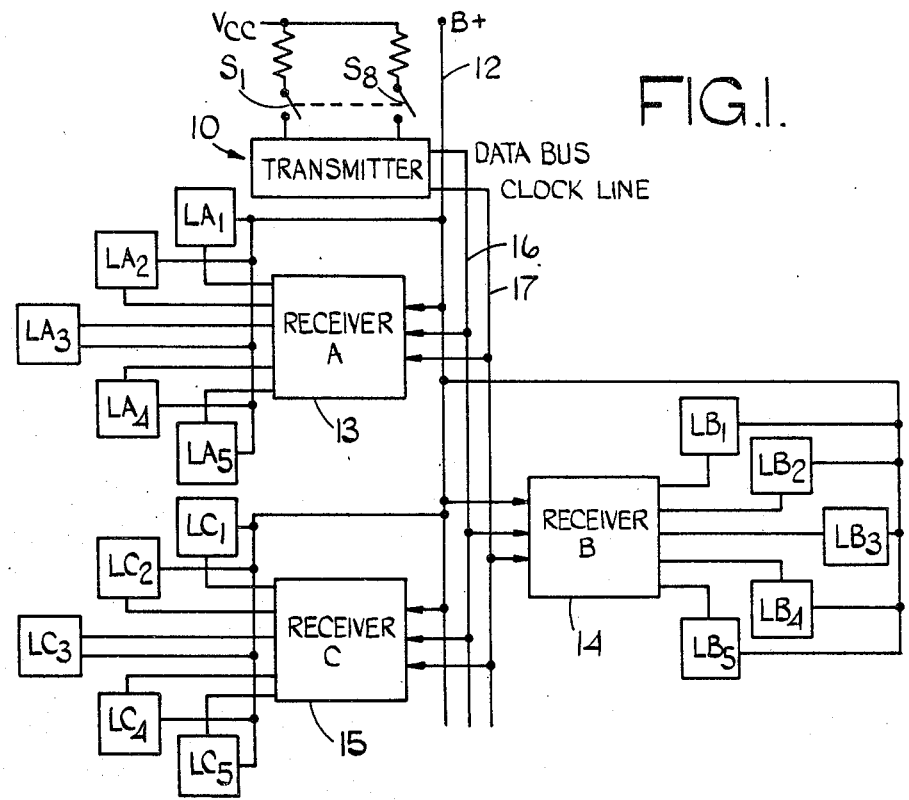

United States Patent [19]

McCulloch

[11] 4,302,841

[45] Nov. 24, 1981

[54] MOTOR VEHICLE ELECTRICAL SYSTEM

[75] Inventor: James M. McCulloch, Birmingham, England

[73] Assignee: Lucas Industries Limited, Birmingham, England

[21] Appl. No.: 105,045

[22] Filed: Dec. 18, 1979

[30] Foreign Application Priority Data

Dec. 22, 1978 [GB] United Kingdom ............... 49766/78

[51] Int. Cl.³ ............................................. G06F 11/14
[52] U.S. Cl. ..................................... 371/70; 307/10 R
[58] Field of Search ....................... 371/14, 20, 22, 69, 371/70; 307/10 R, 10 LS

[56] References Cited

U.S. PATENT DOCUMENTS

| | | | |
|---|---|---|---|
| 3,624,603 | 11/1971 | Delcomyn | 371/70 |
| 3,876,980 | 4/1975 | Haemmig et al. | 371/69 |
| 3,906,445 | 9/1975 | Beckmann et al. | 371/69 |
| 3,973,242 | 8/1976 | Field et al. | 371/69 X |
| 4,045,771 | 8/1977 | Loreck | 371/70 |
| 4,133,504 | 1/1979 | Dobler et al. | 371/69 |
| 4,156,151 | 5/1979 | Borroni | 307/10 R |
| 4,156,866 | 5/1979 | Miller | 371/69 |

Primary Examiner—Jerry Smith
Attorney, Agent, or Firm—Ladas & Parry

[57] ABSTRACT

An automotive vehicle electrical system includes a transmitter device (10) which is sensitive to the status of a set of control switches (S1 to S8) to produce a sequence of digital words, each containing an address code, a repetition of the address code, a command code, and a repetition of the command code. A set of receivers (A, B, C) are distributed around the vehicle and each controls a set of loads (LA, LB, LC). Each receiver includes address code recognition logic and operates to control the associated loads in accordance with the command code included in the same word as its address code, and also verification logic for checking that each code is consistent with its inverse.

3 Claims, 8 Drawing Figures

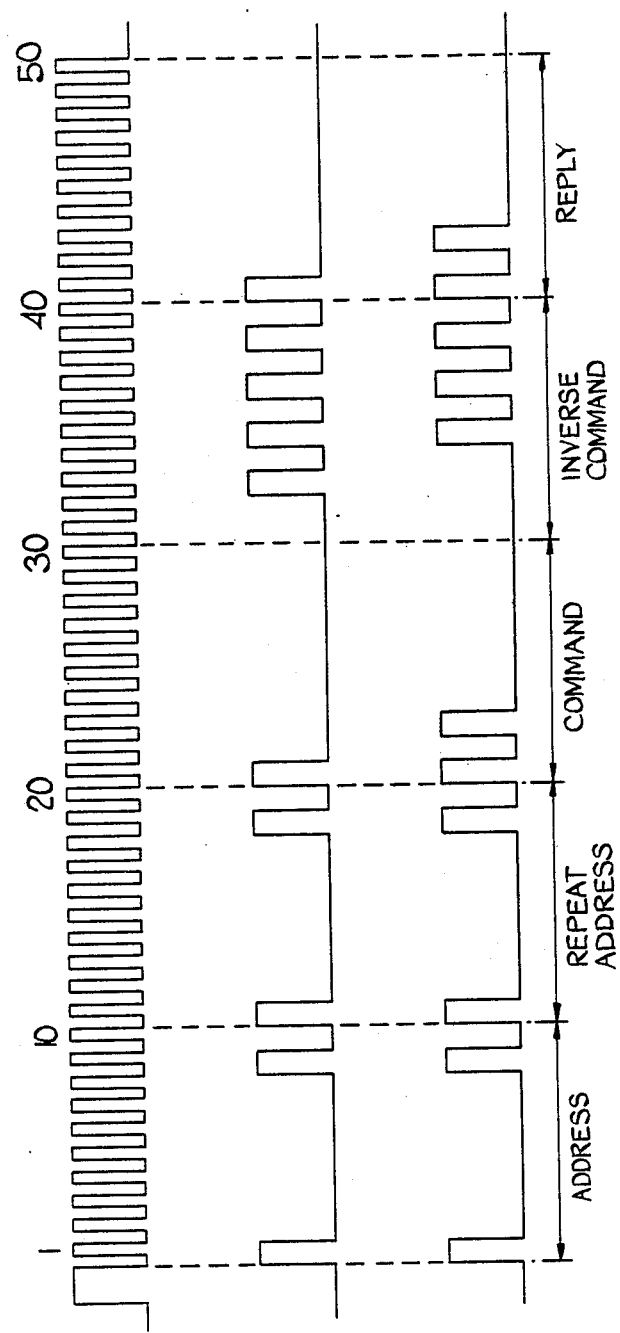

MOTOR VEHICLE ELECTRICAL SYSTEM

This invention relates to a motor vehicle electrical system of the general type in which a plurality of electrical loads distributed about the vehicle are controlled by switches on a central console or switchboard.

In conventional electrical systems the switches control the loads directly, that is to say each switch is connected by a current carrying cable to the associated load or loads. Such an arrangement is very inefficient in its use of wire and requires the production of a complex wiring harness for a vehicle.

With a view to reducing the amount of wire used and simplifying the wiring harness, it has been proposed to employ a multi-plex control system in the vehicle. With such a system all the electrical loads are interconnected by a relatively simple wiring main and the control switches no longer control the load current directly, but are used only in the generation of a control signal which determines whether or not a particular load is energised.

In particular it has been proposed to control the loads digitally by utilizing a transmitter device sensitive to the states of the various control switches to generate a sequence of digital signals. The various loads are grouped together and each group is controlled by a receiver which is assigned a digital address code. The transmitter device repeatedly generates a "page" consisting of a series of digital words each including the address code of a particular receiver and a command code identifying the required states of the loads associated with the receiver.

It has previously been recognised that the automotive vehicle environment is a very difficult one in which to operate complex electronic circuits, because of the electrical noise which exists. In order to reduce the effects of such noise, a previously proposed digital multiplex electrical system included in each receiver storage means for storing the command words applicable to that receiver in the previous two pages and command up-dating only took place if a new command word appeared identically in three successive pages.

Clearly such an arrangement has the effect of increasing the response time of the system undesirably.

It is one object of the present invention to provide a digital multiplex vehicle electrical system in which a high level of security against noise interference can be obtained without excessively long response times being necessary.

In accordance with the invention there is provided an automotive vehicle electrical system including a transmitter device which is sensitive to the states of a plurality of control switches to produce a sequence of digital words each containing an address code and a command code, a plurality of receiver devices distributed around the vehicle and each controlling a plurality of loads, each receiver including address code recognition means and operating to control the associated loads in accordance with the command code included in the same word as its address code, the transmitter being such that each word of the digital sequence contains in addition to the address code and the command code, a repetition of one code and the inverse of the other code, each receiver including code checking means for checking that each code is consistent with its repetition or inverse.

Preferably, each word produced by the transmitter contains, in order, the address code, a repetition of the address code, the command code and the inverse of the command code. In this case each receiver may include means to prevent it receiving the command code and the inverse thereof unless the appropriate address code has been received by it twice. This arrangement gives a very high level of noise immunity since each receiver only receives command data when the address data has already been checked and confusion between address and command codes is most unlikely to occur.

Figure 2:
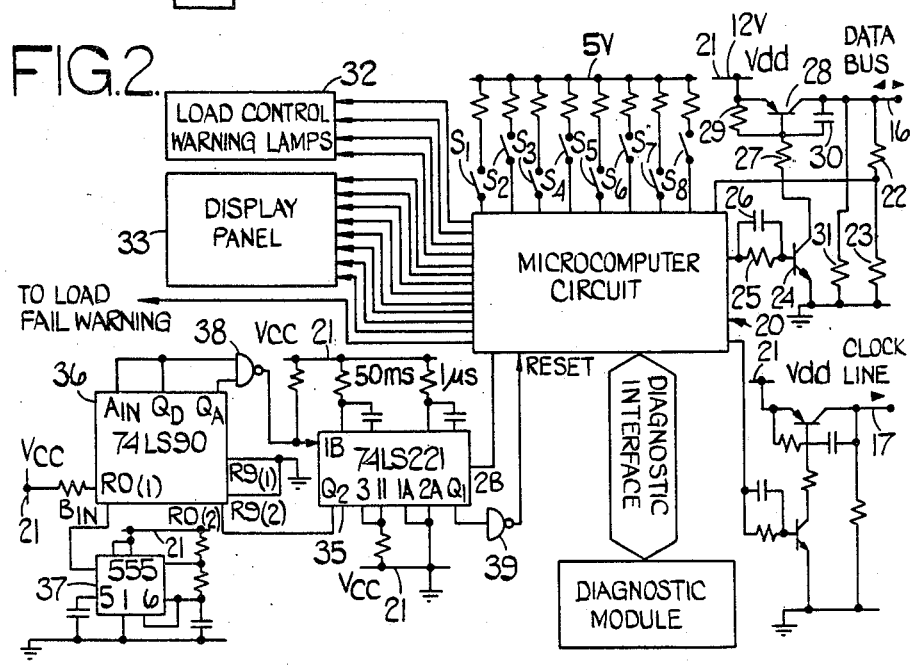
Figure 3:
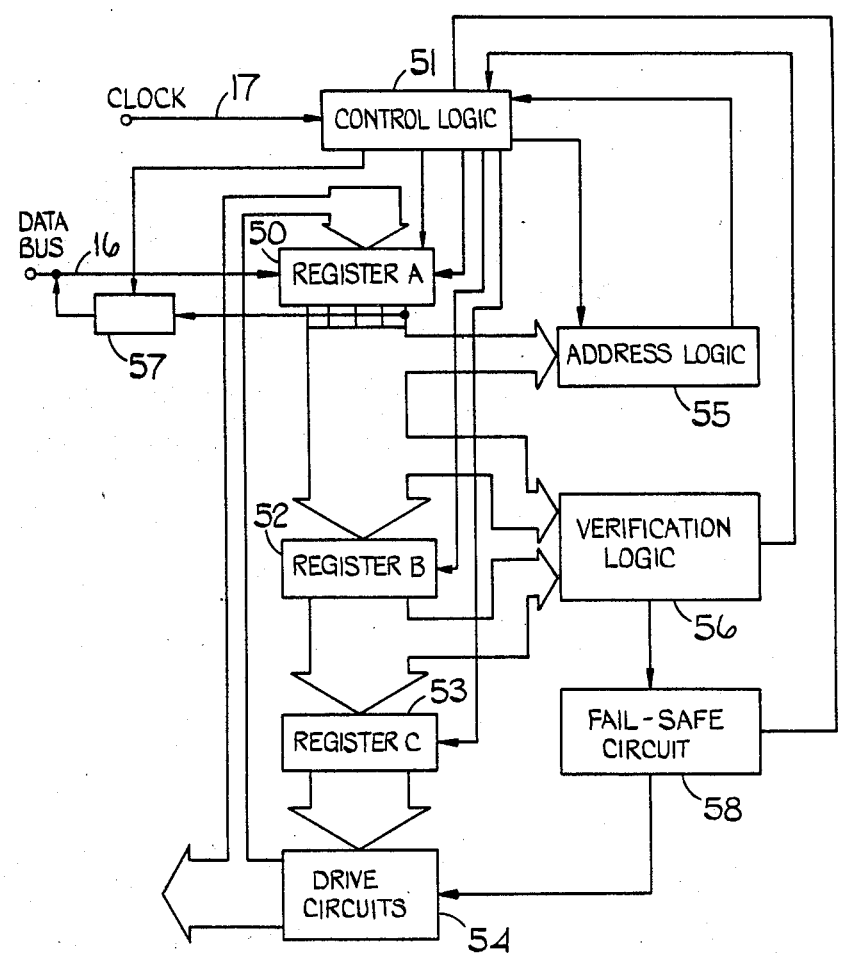
Figure 5:
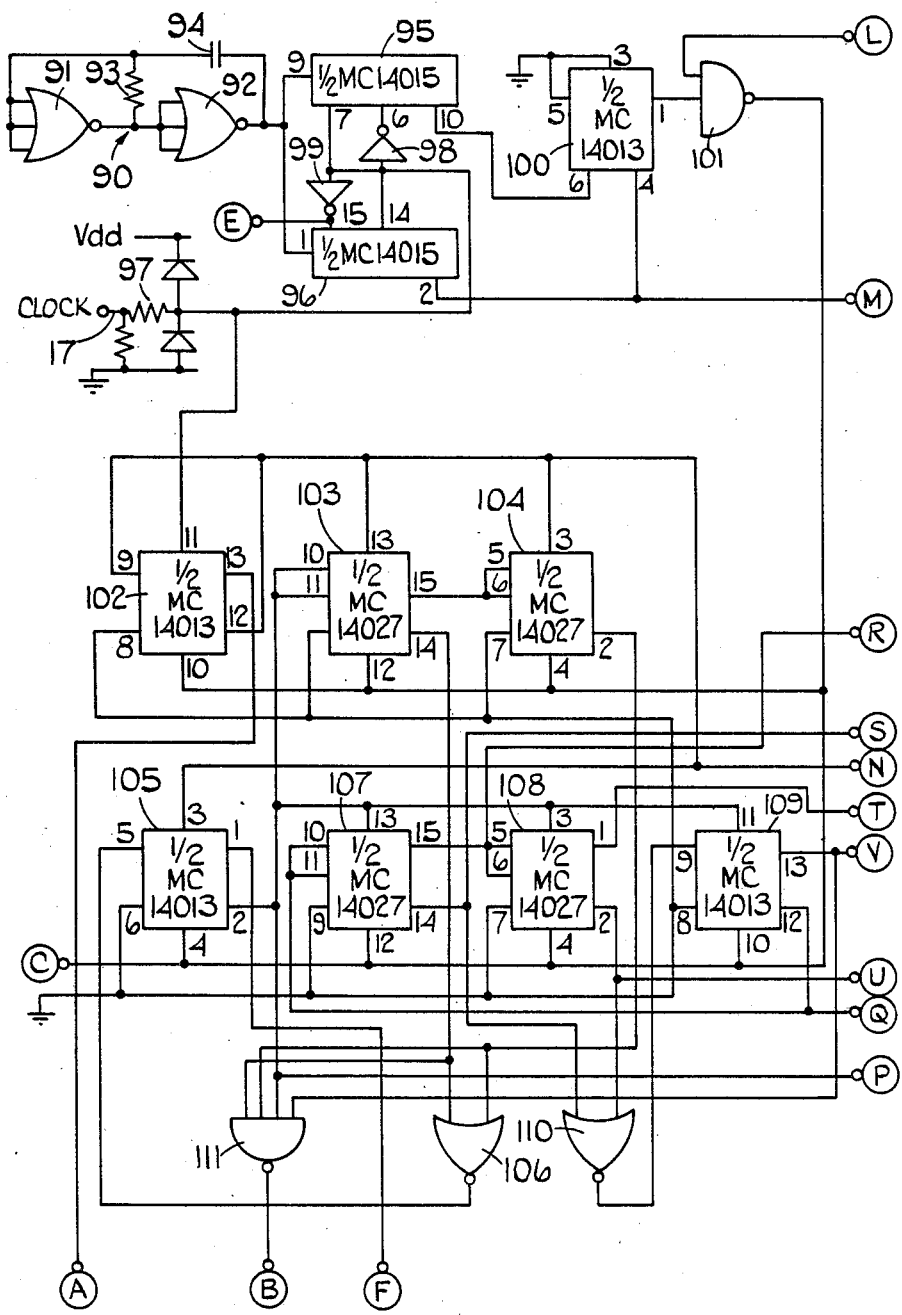
Figure 6:
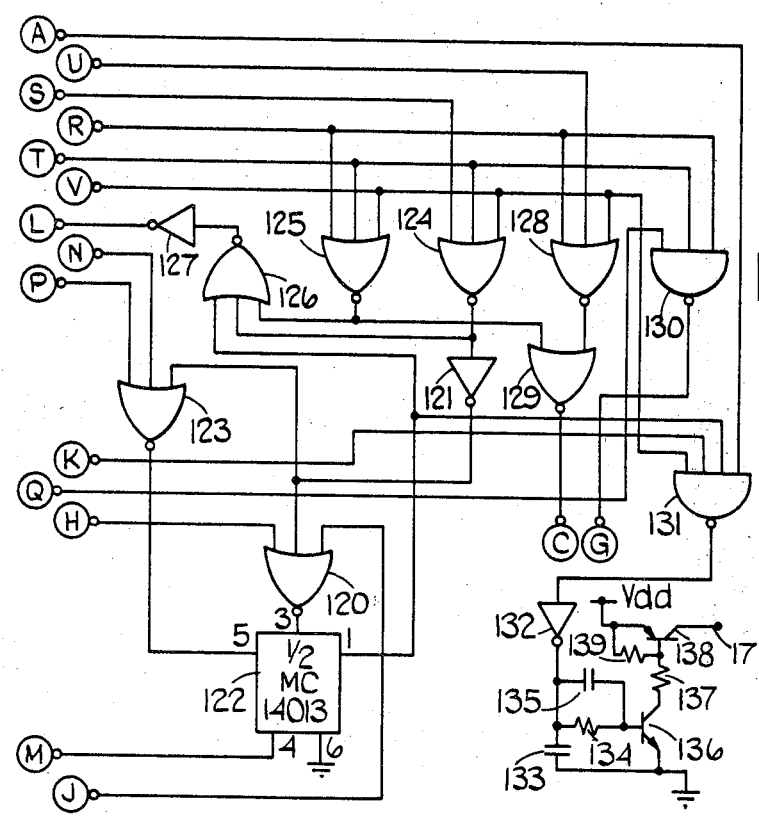
Figure 7:
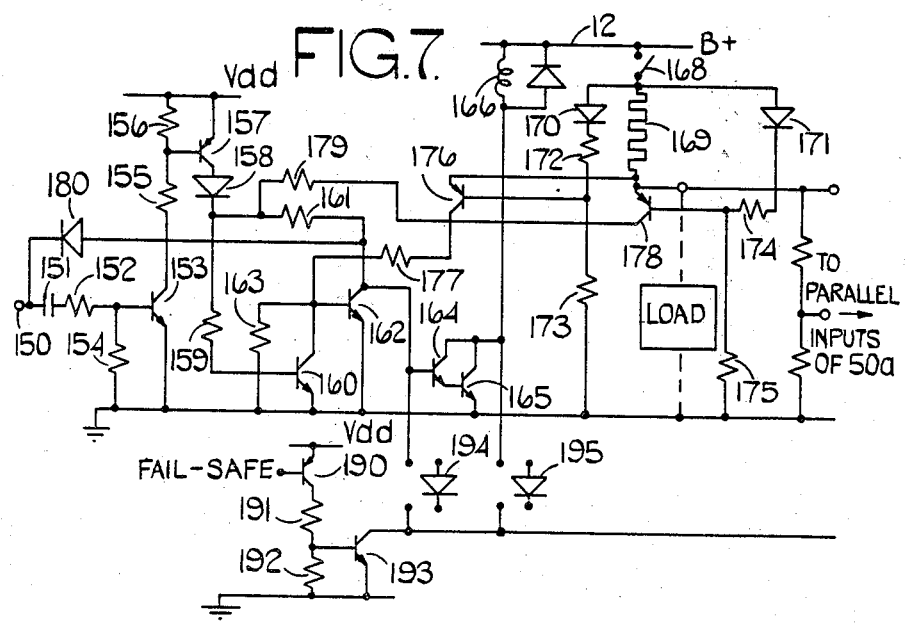

An example of the invention is shown in the accompanying drawings in which:

FIG. 1 is an overall block diagram of the road vehicle electrical system,

FIG. 2 is a block diagram of a transmitter which forms part of the system of FIG. 1, FIG. 2a is a graph illustrating the outputs from the transmitter of FIG. 2, FIG. 3 is a block diagram of a receiver which forms part of the system of FIG. 1, FIGS. 4, 5 and 6 are circuit diagrams showing portions of the receiver of FIG. 3, FIG. 7 is a circuit diagram showing one load circuit of the receiver of FIG. 3.

Referring firstly to FIG. 1, the system described includes a transmitter 10, which has inputs controlled by a plurality of driver operable switches $S_1$ to $S_8$ inclusive, which are required to control various vehicle functions such as, for example, the vehicle parking lights, the main beam headlamp, the dipped headlamps, right and left direction indicator lamps, a fog lamp, reversing lamps and brake lamps respectively. Instead of the conventional arrangement utilising separate lamp current carrying wires connecting these switches directly to the lamps controlled thereby there is a single current carrying conductor 12 connected to all the loads which are controlled by receivers 13, 14, 15 etc arranged at various positions around the vehicle and each controlling as associated group of loads. Thus, purely by way of example there may be four such receivers at the four corners of the vehicle each controlling the lamps at the associated corner. There may also be switches $S_n$ controlling loads other than lamps where required.

The transmitter 10 is connected to the receivers only by a pair of conductors 16, 17 which are referred to hereinafter as the DATA BUS and the CLOCK LINE respectively.

In FIG. 2 the transmitter 10 is shown to include a microprocessor based circuit 20, the details of the internal connections and programming thereof are not given, but which will be understood by one skilled in the art as a result of the following description of the output signals obtained.

Each of the switches $S_1$ to $S_8$ controls the connection of an input port of the circuit 20 to a supply rail 21 held at a regulated voltage (lower than the battery voltage). A further input port of the circuit 20 is connected to the common point of two resistors 22, 23 connected in series between the DATA BUS 16 and the vehicle earth.

The circuit 20 has two of its output ports connected to drive circuits for transmitting pulse code modulated signals to the DATA BUS 16 and CLOCK LINE 17. The drive circuit for the DATA BUS 16 includes an input transistor 24 which has its emitter earthed and its base connected to the appropriate output port by a resistor 25 and a capacitor 26 in parallel. The collector of the transistor 24 is connected by a resistor 27 to the base of a pnp output transistor 28, the emitter of which is connected to the rail 21. A resistor 29 is connected between the base and emitter of transistor 28 to bias it off and a capacitor 30 is connected between the base and collector of transistor 28, to limit the rate of change of the signal at such collector which is connected to the DATA BUS 16. A resistor 31 is connected between the BUS 16 and earth to provide a suitable load for the transistor 28 and determine the time constant of the capacitor 30.

The drive circuit for the CLOCK LINE 17 is identical.

Further output ports of the circuit 20 are connected to a lamp array 32 to indicate which of the switches $S_1$ to $S_8$ have been closed and to a further display panel 33 intended to indicate faulty lamps as will hereinafter be made clear. The lamp array 32 is merely intended to act as a reminder to the driver that certain loads are energised.

A system failure detector is included in the transmitter, which is also used for delaying start up of the transmitter at switch on and to ensure that the transmitted data sequence commences correctly.

This failure detector includes a dual monostable circuit 35 with one input $2B$ connected to an output of the circuit 20 and the corresponding output $Q_2$ connected to one of the reset terminals of a decade counter 36. The counter 36 has its QD output connected to one of its input terminals $A_{IN}$ the other of which $B_{IN}$ is connected to the output of an astable multi-vibrator circuit based on a well-known 555 type integrated circuit 37. The $Q_A$ and $Q_D$ outputs of the counter 36 are connected to the inputs of a NAND gate 38, the output of which is connected to the $1_B$ input of the dual monostable circuit 35. The $Q_1$ output of the dual monostable circuit is connected via an inverter circuit 39 to a reset terminal of the microprocessor circuit 20.

The counter 36 operates as a divide-by-ten counter providing falling edge input to the dual monostable circuit 35 so that the microprocessor is reset via inverter 39 if the $Q_A$ and $Q_D$ outputs of counter 36 ever output 1 simultaneously. This is normally prevented from happening by the provision of an output pulse from the microprocessor circuit 20 once per page which causes one of the monostable circuits of circuit 35 to produce a 1 microsecond reset pulse which reset counter 36 once per page and prevents it counting up to nine. During start up the microprocessor circuit is reset when the counter 36 has received ten pulses from the astable multivibrator 37 whereafter the normal cycle commences.

Each of the receivers is assigned an address code, which in the present example is a five bit digital code. This allows up to $2^5-1$ (i.e.31) receivers to be employed. Each receiver in the present example controls five separate loads so that a five bit command code is required to control each group of loads. In addition, each receiver is arranged to generate a five bit reply code indicating the current state (on or off) of its five loads.

The transmitter is required to produce a sequence of pulse coded words containing the address codes and command codes. The transmitter, is also required to produce clock signals on the CLOCK LINE 17, synchronised with the bits of each coded word. FIG. 2a shows the CLOCK LINE signals and the signals on the DATA BUS 16 in one cycle of operation of the transmitter and the effect of changing one of the switches $S_1$ to $S_8$ on the signals on DATA BUS 16.

The top wave form in FIG. 2a shows the clock signals which are transmitted during the time when one word is transmitted on the DATA BUS 16. As shown before the word commences the signal on the CLOCK LINE 17 is low and immediately before commencement of transmission of the word, the signal on the CLOCK LINE goes high for three clock periods and then goes low and high for alternate clock periods until it has gone high fifty times. The clock line signal then remains low for a time until transmission of the next word is about to commence.

The second wave form shown in FIG. 2a shows the coded signal associated with the receiver coded 10001. As will be seen the first 1 in the address code commences as the triple length clock pulse ends and lasts two clock periods. There is then a gap of fourteen clock periods when the DATA BUS signal goes high again for two clock periods. The DATA BUS signal then goes low again for two clock periods and the address code is then transmitted again. The command code is then transmitted in this case merely a single pulse denoting a command code 10000. Thereafter the inverse of the command code—i.e. 01111 is transmitted. Finally a reply code 10000 is produced by the receiver, indicating that the loads controlled by that receiver are appropriately energised.

The final waveform shown in FIG. 2a contains the same address code and address repeat code, but the command code is 11000 and the inverse command code 00111. The reply code is 11000.

In the case for example, when the address code 10001 indicates a receiver at the left hand front corner of the vehicle the five loads controlled by the receiver may be the left side-light, the left main beam headlamp filament, the left dip beam filament, the left front direction indicator and a fog lamp. During the production of the middle waveform of FIG. 2a only the side light switch $S_1$ was closed, but in the lower waveform the change has arisen because the switch $S_2$ for the main beam headlamps has been closed. It will be appreciated that in the first case corresponding signals will go to the receivers at all four corners of the vehicle, whereas the added signals in the second case will go only to the front corner receivers.

The receiver shown in FIG. 3 includes an input shift register 50 loading of which is controlled by a control logic circuit 51 receiving an input signal from the CLOCK LINE 17. The receiver includes a second register 52 and a third register 53 which actually provides output signals to drive circuits 54 controlling the loads. Each register 50, 52, 53 is a five bit register and, broadly, the receiver operates as follows:

Firstly, when a triple length clock signal is received by the logic circuit 51 the first five bits of the word are clocked into the register 50. These five bits are transferred into the register 52 by the action of the circuit 51 and the next five bits of the word are then admitted to the register 50.

Following clocking in of the second five bits of the word a verification logic circuit 56 checks that the contents of registers 50 and 52 are both the same as the receivers address code. If not, the receiver shuts down. If they are the same, the next five bits of the word are clocked into the register 50 and transferred to the register 52 and the fourth five bits are clocked into register 50. The verification logic circuit 56 now checks whether the two command codes are mutually inverse and if not closes down the receiver. If the two command codes are mutually inverse, the contents of register 52 are transferred into register 53 to cause any necessary changes in the load states.

At this stage the signals on five output terminals from the drive circuits 54 representing the actual states of the loads are transferred into the register 50 and then clocked out on to the DATA BUS 16 via an output gate 57 controlled by the logic circuit 51.

FIG. 3 also shows a failsafe circuit 58 which is controlled by the verification circuit 56. If the circuit 56 fails to produce a command code verified signal within a predetermined time interval (greater two complete cycles of the transmitter) the circuit 58 produces an output to drive the drive circuits into a selected "safe" condition.

Figure 4:
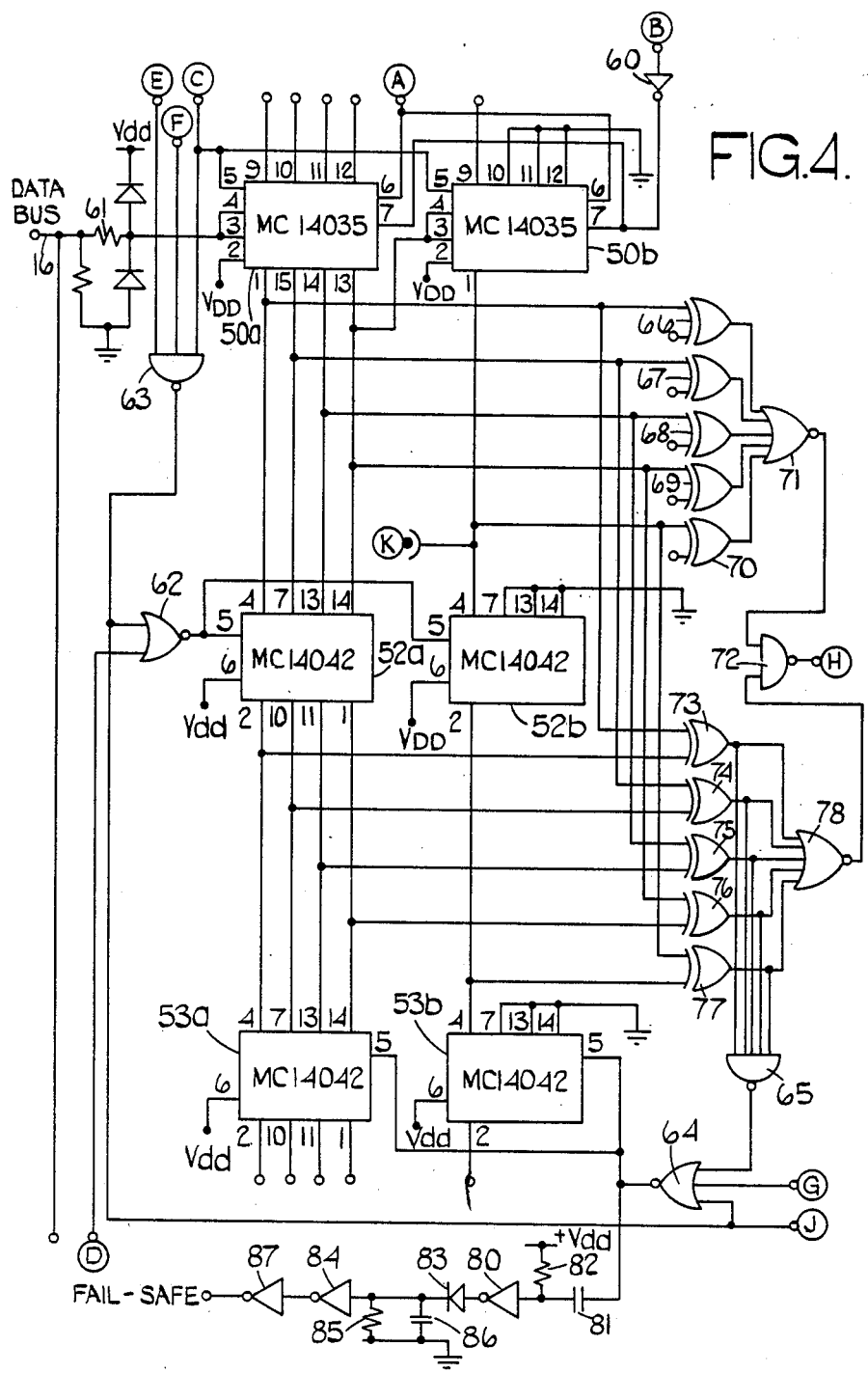

As shown in FIG. 4, the register 50 consists of two MC 14035 shift register circuits 50a, 50b connected in cascade, three stages of the circuit 50b being unused. The CLOCK terminal of each circuit 50a, 50b is connected to a terminal A (FIG. 5) and the PARALLEL/-SERIAL terminal of each is connected to the output of an inverter 60 having its input connected to a terminal B (FIG. 5). The J and K input terminals of the circuit 50a are connected to the DATA BUS 16 via a resistor 61, clipping diodes being connected to prevent damage to the circuit 50a. The J and K input terminals of circuit 50b are connected to the Q3 output of the circuit 50a. The RESET terminals of circuits 50a and 50b are connected to a terminal C (FIG. 5).

The register 52 consists of two four bit latch circuits type MC 14042 marked 52a and 52b. The $D_0$, $D_1$, $D_2$ and $D_3$ data input terminals of circuits 52a are connected to corresponding ones of the $Q_0$, $Q_1$, $Q_2$ and $Q_3$ outputs of the circuits 50a and the $D_0$ input of circuit 52b is connected to the $Q_0$ output of circuit 50b. The CLOCK inputs of circuits 52a and 52b are connected to the output of a NOR gate 62 having one input connected to the output of a NAND gate 63 and its other input connected to a terminal D (FIG. 6). The gate 63 has an input from terminal C, and inputs from two terminals E and F (FIG. 5).

The register 53 consists of two further MC 14042 latch circuits 53a and 53b. The $D_0$ to $D_3$ data inputs of circuit 53a are connected to the $Q_0$ to $Q_3$ outputs of circuit 52a and the $D_0$ input of circuit 53b is connected to the $Q_0$ output of circuit 52b. The CLOCK inputs of circuits 53a and 53b are connected to the output of a NOR gate 64 with one input from the output of NAND gate 63, one input from a NAND gate 65 and one input from a terminal G, (FIG. 6).

The address recognition logic includes five EXCLUSIVE OR gates 66, 67, 68, 69 and 70 each of which has one terminal connected to an appropriate one of the Q output terminals of the circuits 50a, 50b. The other terminal of each gate 66, to 70 is connected either to a supply rail or to earth to define the address code of the receiver in question. These other terminals are left-open in FIG. 4. The outputs of the gates 66 to 70 are connected to the inputs of a NOR gate 71, the output of which is connected to one input of a NAND gate 72, the output of which is connected to a terminal H (FIG. 6).

The verification logic 56 includes five EXCLUSIVE OR gates 73, 74, 75, 76 and 77 each of which has one input connected to a corresponding one of the Q outputs of circuits 50a, 50b and its other input connected to the corresponding one of the Q outputs of the circuits 52a, 52b. The outputs of gates 73 to 77 are connected to the inputs of another NOR gate 78, the output of which is connected to the other input of NAND gate 72.

The NAND gate 65 has its inputs connected to the outputs of gates 73 to 77.

It will be appreciated that gates 66 to 70 and 73 to 77 each produces a low output when the inputs to its input terminals are the same. Thus if the Q outputs of circuits 50a and 50b match the receiver address codes there will be a low output from all of the gates 66 to 70 and hence the output of the NOR gate 71 will be high. If any bit of the address differs from the corresponding Q output of circuit 50a or 50b the output of that gate will be high so that the output of gate 71 will be low enabling the output of gate 72 to go high. This latter condition holds if any Q output of circuits 50a, 50b differs from the corresponding Q output of circuits 52a, 52b. The output of gate 65 is low only when the Q outputs of circuits 52a, 52b are the inverse of the Q outputs of circuits 50a, 50b. The output terminal of the gate 63 is connected to a terminal J (FIG. 6) and the $Q_0$ output of circuit 50b is connected to a terminal K (FIG. 6).

The failsafe circuit includes a inverter 80 which has its input connected by a capacitor 81 to the output of gate 64 and by a resistor 82 to the $V_{dd}$ line of the receiver (each receiver including its own power supply stabiliser not shown). The output of inverter 80 is connected to the anode of a diode 83, the cathode of which is connected to the input of another inverter 84. This inverter 84 input is also connected by a resistor 85 and capacitor 86 in parallel to earth. Finally a third inverter 87 has its input connected to the output of inverter 84 and its output connected to a FAILSAFE terminal (FIG. 7).

The output of gate 64 goes from low to high only when the output of gate 65 goes low whilst the output of gate 63 is low and the signal at terminal G is low and this transition indicates verification of a command code. It is this transition which causes the circuits 53a, 53b to be refreshed from the corresponding Q outputs of circuits 52a, and 52b. This transition also causes the input of inverter 80 to go low, thereby causing the capacitor 86 to be charged up via diode 83, thereby maintaining the signal at the FAILSAFE terminal high. The capacitor 86 discharges via the resistor and if it is not recharged periodically its voltage will fall so low that the FAILSAFE output goes low, the effect of which will be explained hereinafter.

FIG. 5 shows part of the control logic 51, and includes a part of the control logic which is intended to recognise the triple length clock pulse which occurs at the commencement of each word. To this end there is provided a local oscillator 90 consisting of two NOR gates 91, 92 and a feedback circuit consisting of a resistor 93 and a capacitor 94. The resistor 93 is connected between the input and output of gate 91, the output of gate 91 being connected to the input of gate 92, and the capacitor 94 is connected between the output of gate 92 and the input of gate 91.

The output of the gate 92 is applied to the CLOCK terminals of two four-bit shift registers 95, 96 together making up a type MC 14015 integrated circuit. The DATA input of the register 95 and the RESET input of the register 96 are connected to the CLOCK LINE 17 via a resistor 97, clipping diodes again being provided for protection of the integrated circuits. Two inverters 98, 99 also connect the CLOCK LINE 17 to RESET input of register 95 and the DATA input of the register 96 respectively, the output of inverter 99 being connected to the terminal E. The $Q_3$ outputs of the registers 95 and 96 are connected respectively to the SET and RESET terminals of a D type flip-flop circuit 100 the D and CLOCK inputs of which are both grounded. The Q output of flip-flop circuit 100 is connected to one input of a NAND gate 101 having its other input connected to a terminal L (FIG. 6). The $Q_3$ output of register 96 is also connected to a terminal M (FIG. 6).

The output terminal of the NAND gate 101 is connected to terminal C and provides reset signals for the receiver logic. The shift registers 95 and 96 are clocked by the local oscillator 90. Between data words, while the CLOCK LINE signal is low, the signal at the DATA input of register 96 is high and the output from the $Q_3$ output of this register therefore runs high, maintaining the flip-flop 100 in its RESET condition, i.e. with its Q output low. Provided the signal at terminal L is also low, the output of gate 101 is high. When the triple length pulse appears on the CLOCK LINE 17 at the commencement of a data word, register 96 is reset, but this high signal is clocked through register 95 so as to set flip-flop 100 and cause the output of gate 101 to go low. The frequency of oscillator 90 is arranged to be sufficient to ensure that the CLOCK LINE high is clocked through before the first data pulse commences.

The CLOCK LINE signal is also applied to the CLOCK input of a D type flip-flop circuit 102 which forms the first stage of a control counter for the receiver. The RESET terminal of circuit 102 is connected to the output of gate 101. The D input terminal of circuit 102 is connected to a terminal N (FIG. 6). The Q output of circuit 102 is connected to terminal A and the $\overline{Q}$ output is connected to terminal N. The circuit 102 operates as a divide-by-two input stage, providing out of phase pulse trains at half the clock frequency at terminals A and N whenever the output of gate 101 is low.

The second stage of the control counter is a J/K type flip-flop circuit 103, followed by a J/K flip-flop circuit 104 and a D type flip-flop circuit 105 connected with a NOR gate 106 as a divide-by-five counter. The CLOCK inputs of circuits 103, 104, and 105 are all connected to the $\overline{Q}$ output of circuit 102, their RESET terminals are all connected to the output of gate 101, and their SET terminals are all earthed. The J and K input terminals of circuit 103 are connected to the $\overline{Q}$ output terminal of circuit 105. The J and K input terminals of circuit 104 are connected to the $\overline{Q}$ output of circuit 103. The D input of circuit 105 is connected to the output of gate 106 which has one input from the $\overline{Q}$ output of circuit 103 and its other input from the $\overline{Q}$ output of circuit 104. The Q output of circuit 105 is connected to terminal F and its $\overline{Q}$ output is connected to a terminal P (FIG. 6).

The control counter also includes two further J/K type flip-flop circuits 107, 108 and a further D type flip-flop circuit 109 connected with a NOR gate 110 as a further divide-by-five counter. The CLOCK inputs of circuits 107, 108 and 109 are all connected to the $\overline{Q}$ output of circuit 105, their RESET terminals are all connected to the output of gate 101 and their SET terminals are all connected to earth. The J and K inputs of circuit 107 are connected to the $\overline{Q}$ output of circuit 109 which is also connected to a terminal Q (FIG. 6). The J and K inputs of circuit 108 are connected to the Q output of circuit 107 and the D input of circuit 109 is connected to the output of gate 110 which has one input from the $\overline{Q}$ output of circuit 108 and its other input from the $\overline{Q}$ output of circuit 107. The Q and $\overline{Q}$ outputs of circuit 107, the Q and $\overline{Q}$ outputs of circuit 108, and the Q output of circuit 109 are connected respectively to terminals R,S,T,U and V (all FIG. 6).

A NAND gate 111, which has inputs from the $\overline{Q}$ output of circuit 104, the $\overline{Q}$ output of circuit 105 and the Q output of circuit 109 has its output terminal connected to terminal B.

Turning now to FIG. 6, the remainder of the control logic is shown therein. A NOR gate 120 has two of its input terminals connected to terminals H and J respectively and a third input terminal connected to the output of an inverter 121. The output of gate 120 is connected to the CLOCK terminal of a D type flip flop circuit 122, the SET input terminal of which is earthed and the RESET input terminal of which is connected to terminal M. The D input of circuit 122 is connected to the output of a NOR gate 123 which has two inputs from terminals N and P respectively and a third input from the output of inverter 121.

The input to inverter 121 is connected to the output of a NOR gate 124 having inputs from terminals S, T and V respectively. A further NOR gate 125 has inputs from terminals R, T and V respectively. A NOR gate 126 has inputs from the Q output of circuit 122 and from the outputs of gates 124 and 125. The output of gate 126 is connected to the input of an inverter 127 which has its output connected to terminal L. A NOR gate 128 has inputs from terminals R, U and V respectively and its output is connected to one input of a NOR gate 129 which has its other input connected to the output of the gate 125. The output of gate 129 is connected to terminal C.

A NAND gate 130 has inputs from terminals Q, R and T respectively and its output is connected to terminal G. A further NAND gate 131 has inputs from terminals A, K and V respectively and from the Q output of circuit 122. The output of gate 131 is connected to the input of an inverter 132, the output of which is connected by a capacitor 133 to earth and by a resistor 134 and capacitor 135 in parallel to the base of an npn transistor 136. The emitter of transistor 136 is earthed and its collector is connected by a resistor 137 to the base of a pnp transistor 138 which is biased off by a resistor 139 connected between the base and emitter thereof. The emitter of transistor 138 is connected to the receiver $V_{dd}$ rail and its collector is connected to the DATA BUS 17.

As mentioned above, at the beginning of the transmission of a data word the CLOCK LINE signal goes high and this high signal is clocked through the register 95 and removes the reset signal at the output of gate 101.

The data bits are presented at the J and K inputs of register 50a and this data is clocked into the registers 50a and 50b by the rising edges of the pulses at the CLOCK inputs of the registers 50a and 50b. These pulses are derived from the Q output of circuit 102 and their rising edges occur at the centre of each data bit. After five such edges have been produced the registers 50a and 50b contain the address code. This code is loaded into the circuits 52a and 52b as a result of a clock signal which is gated by gate 63 when the Q output of circuit 105 goes high.

Data continues to be clocked into the registers 50a and 50b for another five pulses and the address recognition circuits then come into effect. Thus the output of gate 72 now goes low causing circuit 122 to be set only if the address code in register 50a and 50b is the same as that in circuits 52a and 52b and the same as that preset for the receiver in question. If this does not occur the output of gate 126 goes high causing the output of gate 101 to reset the circuits and prevent further input.

Data input to the registers 50a and 50b now continues so that the command code is clocked into these registers. Once again, at the end of this period, the circuits 52a and 52b are loaded with data from the registers 50a and 50b and clocking in of the inverse command code proceeds; At the end of this period gates 73 to 77 compare the two codes and gate 65 output goes low if the low codes are inverse. This signal is gated by gate 64 with the signal from gate 63 and that from gate 130 to produce a clock signal for loading the contents of circuits 52a and 52b into circuits 53a and 53b. If no pulse appears at gate 64 for a number of transmitter cycles capacitor 86 discharges as explained above the output of inverter 87 goes low.

At this stage the output of gate 111 goes low for a time so that the load data is loaded into the registers 50a and 50b. Clocking of these registers continues so that the respective bits of the load data are outputted serially at terminal K and gated onto the DATA BUS 17 via gate 131.

Turning now to FIG. 7 one load drive circuit is shown. The input terminal 150 is connected to an appropriate one of the Q output terminals of the circuits 53a 53b of the appropriate receiver.

Terminal 150 is connected by a capacitor 151 and a resistor 152 in series to the base of an npn transistor 153, the emitter of which is connected to earth, a resistor 154 connecting the base of transistor 153 to earth to bias it off. The collector of transistor 153 is connected by two resistors 155, 156 to the $V_{dd}$ rail and the junction of these resistors is connected to the base of a pnp transistor 157 which has its emitter connected to the $V_{dd}$ rail. The collector of the transistor 157 is connected to the anode of a diode 158, the cathode of which is connected by a resistor 159 to the base of a npn transistor 160 and by a resistor 161 to the collector of an npn transistor 162. The emitters of both these transistors 160, 162 are earthed and a resistor 163 connects the base of transistor 162 to earth. The collector of transistor 160 is connected to the base of transistor 162.

The collector of transistor 164 is connected to the base of an npn transistor 164, the emitter of which is connected to the base of an npn transistor 165 which has its emitter earthed. The collectors of transistors 164, 165 are connected together and also connected via a relay winding 166 to the battery rail 12, a freewheel diode 167 being connected across this winding.

The relay has a normally open contact 168 which connects one end of a series resistor 169 to the rail 12. The other end of the resistor 169 is connected to earth by the load. Said one end of resistor 169 is connected to the anodes of two diodes 170 and 171. The cathode of diode 170 is connected by two resistors 172, 173 in series to earth. The cathode of diode 171 is connected by two resistors 174, 175 in series to earth. A pnp transistor 176 has its base connected to the junction of resistors 172, 173, its emitter connected to said other end of resistor 169 and its collector connected by a resistor 177 to the base of transistor 162. A further pnp transistor 178 has its base connected to the junction of resistors 174, 175 its emitter connected to said other end of resistors 169 and its collector connected by a resistor 179 to the cathode of diode 158.

A diode 180 connects the collector of transistor 162 to the input terminal 150.

When it is required to switch on a load the signal at terminal 150 goes high. This causes transistors 153 and 157 to turn on for as long as capacitor 151 is charging. During this time current flowing through resistor 161 causes the transistors 164, 165 to turn on, thereby energising the relay winding 166 and closing. Current flowing in resistor 161 prevents transistor 178 having any effect and current through resistor 159 turns on transistor 160 and prevents transistor 176 having any effect.

At the end of this initial time period, the transistor 178, which turns on if the load current is normal holds the transistor 164, 165 on, thereby latching the relay in the on condition.

If there is a fault such that an abnormally high current flows in the load, transistor 178 turns off because the voltage at its emitter falls lower than that required for the emitter base junction to conduct. As a result transistor 164 and 165 turn off and the relay is de-energised.

If there is a fault such that an abnormally low or no current flows in the load the transistor 176 turns on (because the voltage drop across resistor 169 is reduced to zero in an open circuit condition). This causes transistor 162 to turn on, thereby turning off transistors 164 and 165 and de-energising the relay.

When the signal at terminal 150 is low the transistors 164 and 165 are held off by the diode 180. The capacitor 151 discharges.

The FAILSAFE terminal (FIG. 4) is connected to the base of a pnp transistor 190 which has its emitter connected to the $V_{dd}$ rail. The collector of transistor 190 is connected by two resistors 191, 192 to earth, the junction of these resistors being connected to the base of an npn transistor 193 which has its emitter earthed. The collector of transistor 193 is connected either by a diode 194 to the base of transistor 164 or by a diode 195 to the collector of transistor 165, depending on whether it is required for the particular load to be turned off or on in the failsafe mode.

I claim:
1. An automotive vehicle electrical system including:
a plurality of control switches;
means sensitive to the states of the control switches for producing a sequence of digital words each containing, in order, first, second, third and fourth codes, the first code being an address code, the second code being a code bearing a first predetermined relationship to the address code, the third code being a command code and the fourth code bearing a second predetermined relationship to the command code, one of said first and second predetermined relationships being an inverse relationship and the other of said first and second predetermined relationships being a repetition relationship; and
a plurality of receivers distributed around the vehicle, each having an address code and each including an input register connected to receive data from the producing means, an output register for controlling a plurality of loads, an intermediate register, means for transferring the contents of the input register to the intermediate register, first comparator means for comparing the contents of the input register with the contents of the intermediate register, second comparator means for comparing the contents of one of the input and intermediate registers with the receiver address code, means operable only when said first comparator means indicates that the contents of the input and intermediate registers are in said first predetermined relationship and said second comparator means indicates that the contents of said one register match the receiver address code for permitting continued clocking of data into the input register, and means for transferring the contents of the intermediate register to the output register when the first comparator means indicates that the contents of the input and intermediate registers are in said second predetermined relationship, whereby the receiver operates to control the associated loads in accordance with the command code included in the same word as its address code.

2. An automotive vehicle electrical system as claimed in claim 1 in which said first predetermined relationship is the inverse relationship and said second predetermined relationship is the repetition relationship.

3. An automotive vehicle electrical system as claimed in claim 1 including failsafe means arranged to drive each of the loads of a receiver to a predetermined safe condition in the event that the first comparator means fails to indicate periodically that the contents of the input and intermediate registers are in said second predetermined relationship.

* * * * *